Dec. 19, 1950     C. L. LOVERCH     2,534,360
MACHINE FOR PERFORATING A TAPE, FEEDING IT,
AND ATTACHING SNAP FASTENERS THERETO
Filed May 11, 1945     12 Sheets-Sheet 5
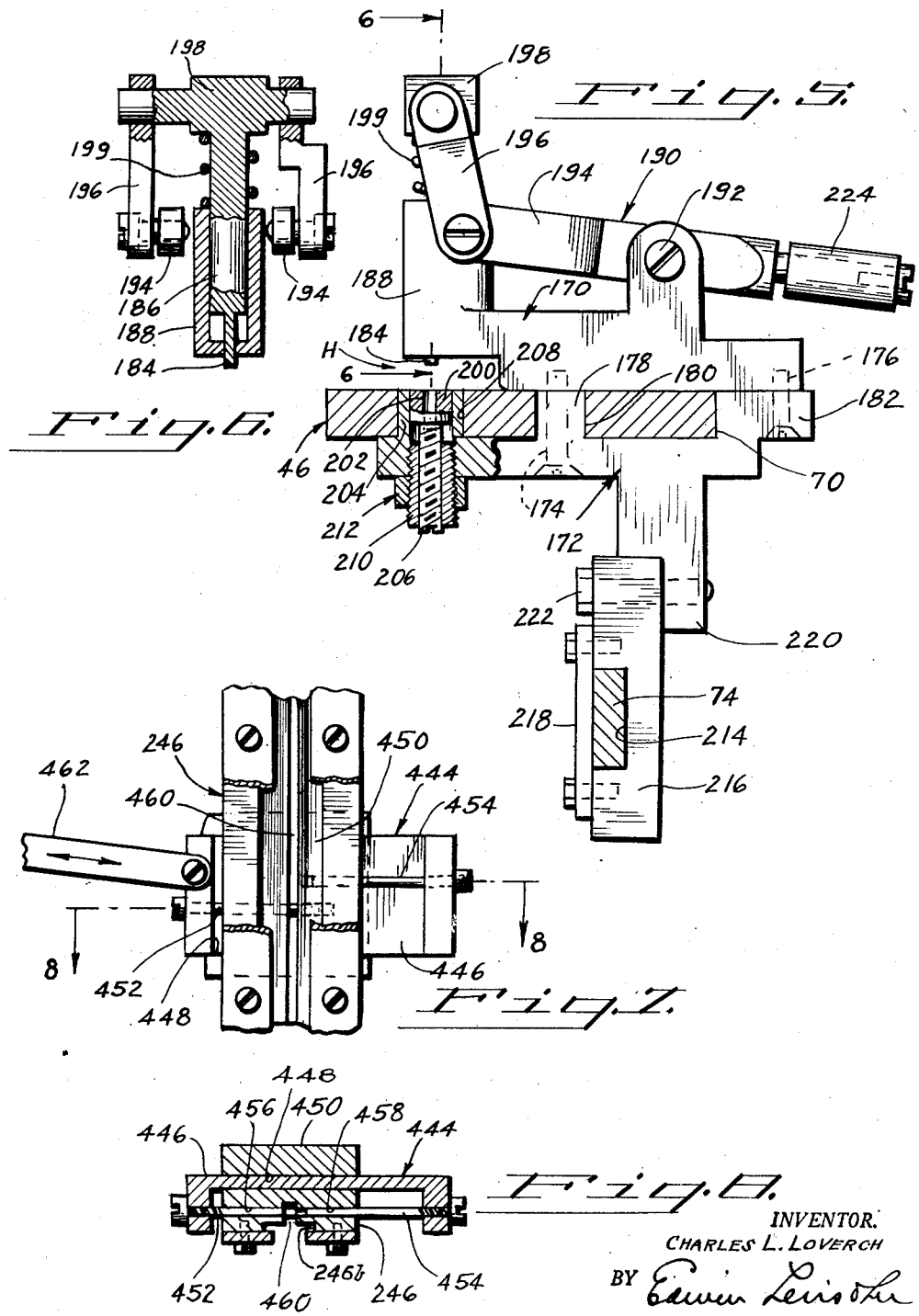
INVENTOR.
CHARLES L. LOVERCH
BY
ATTORNEY.

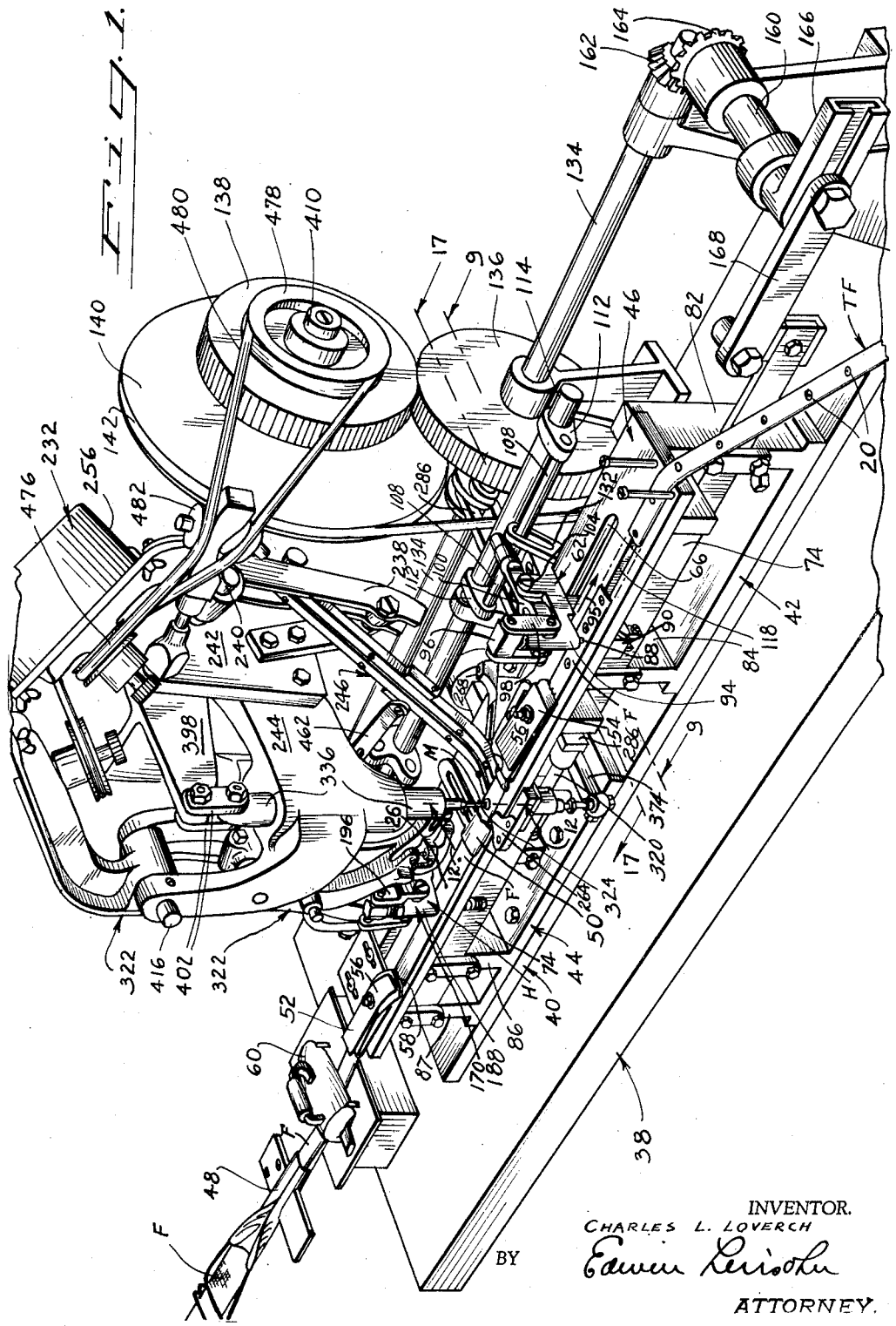

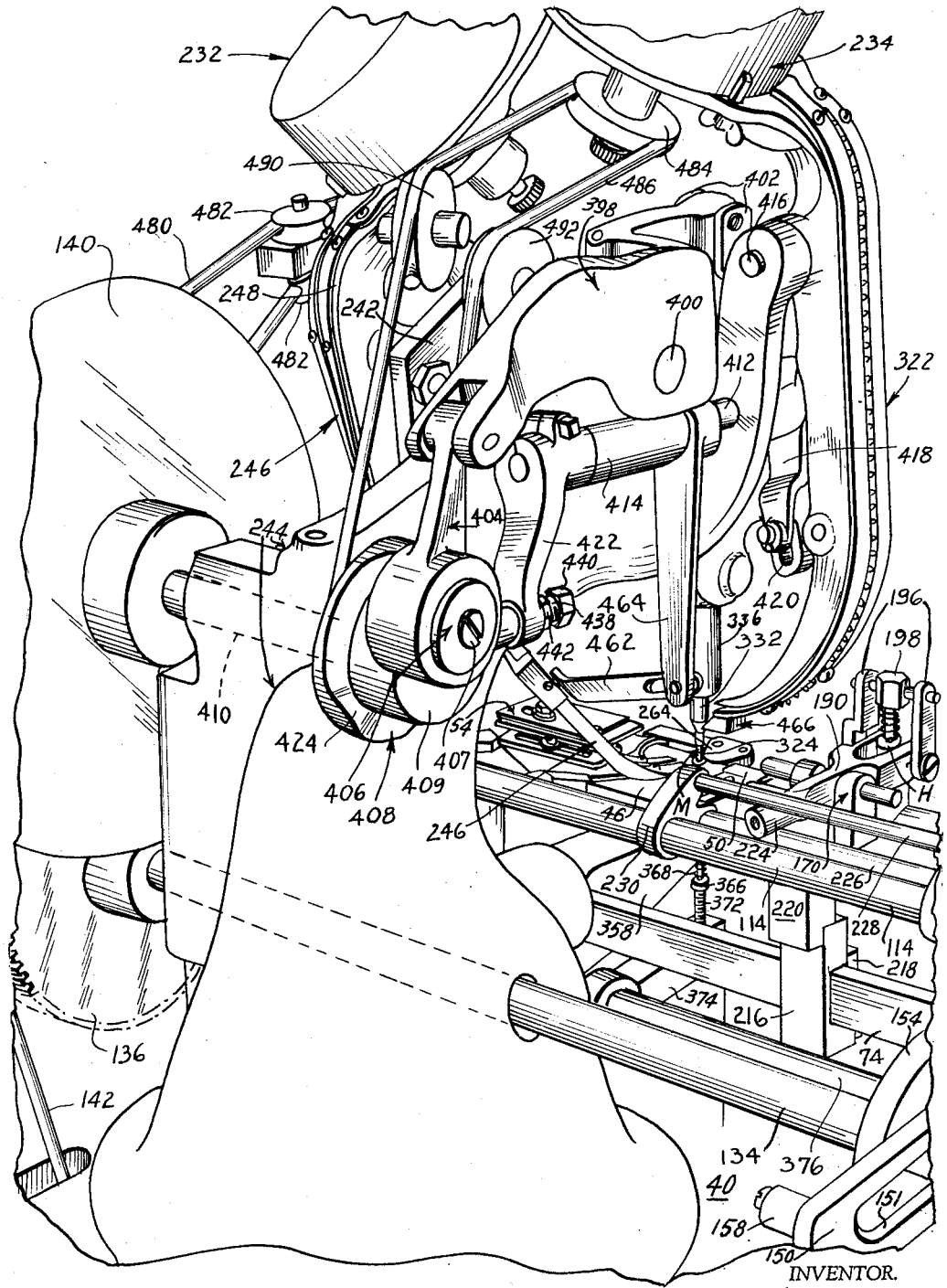

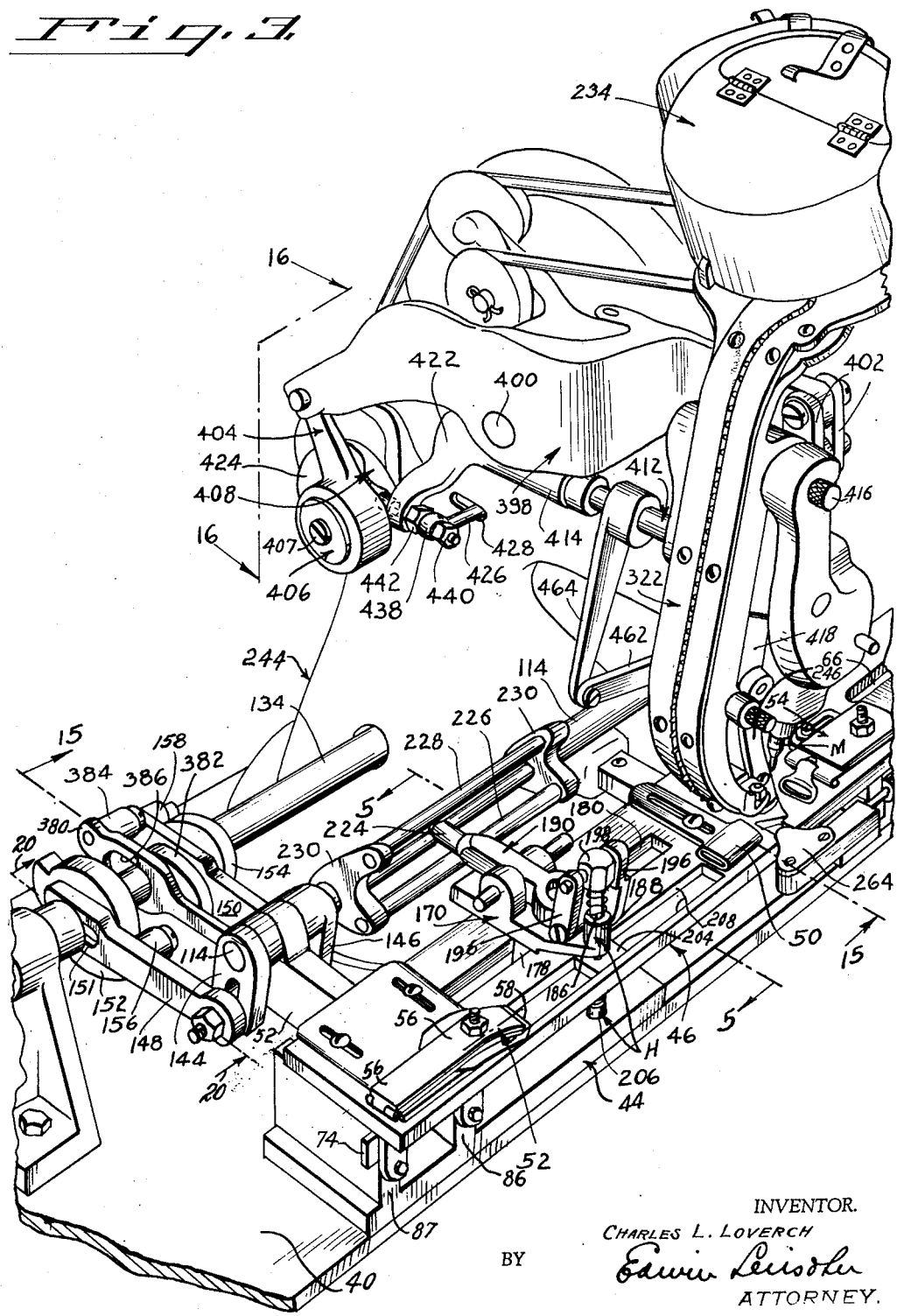

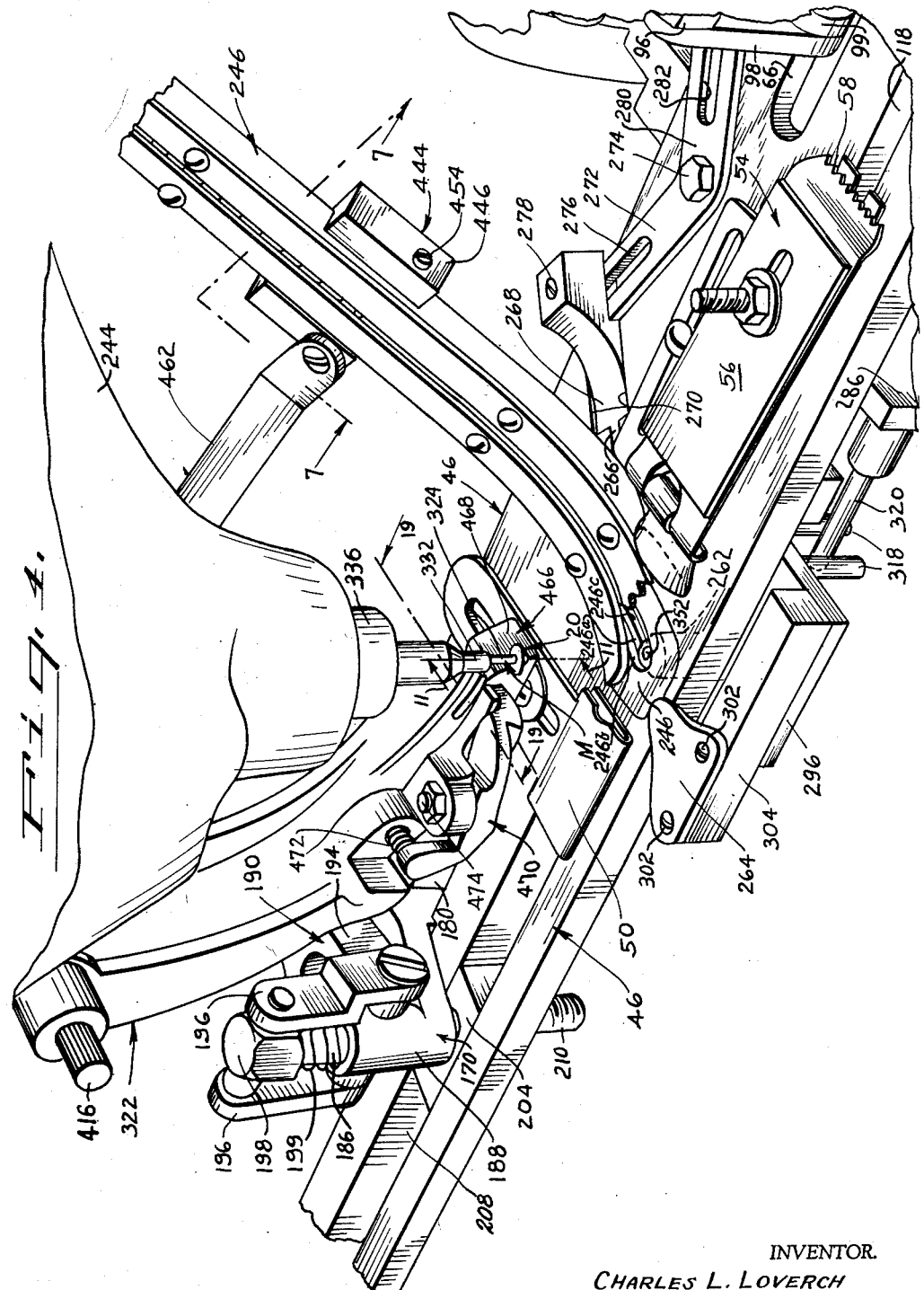

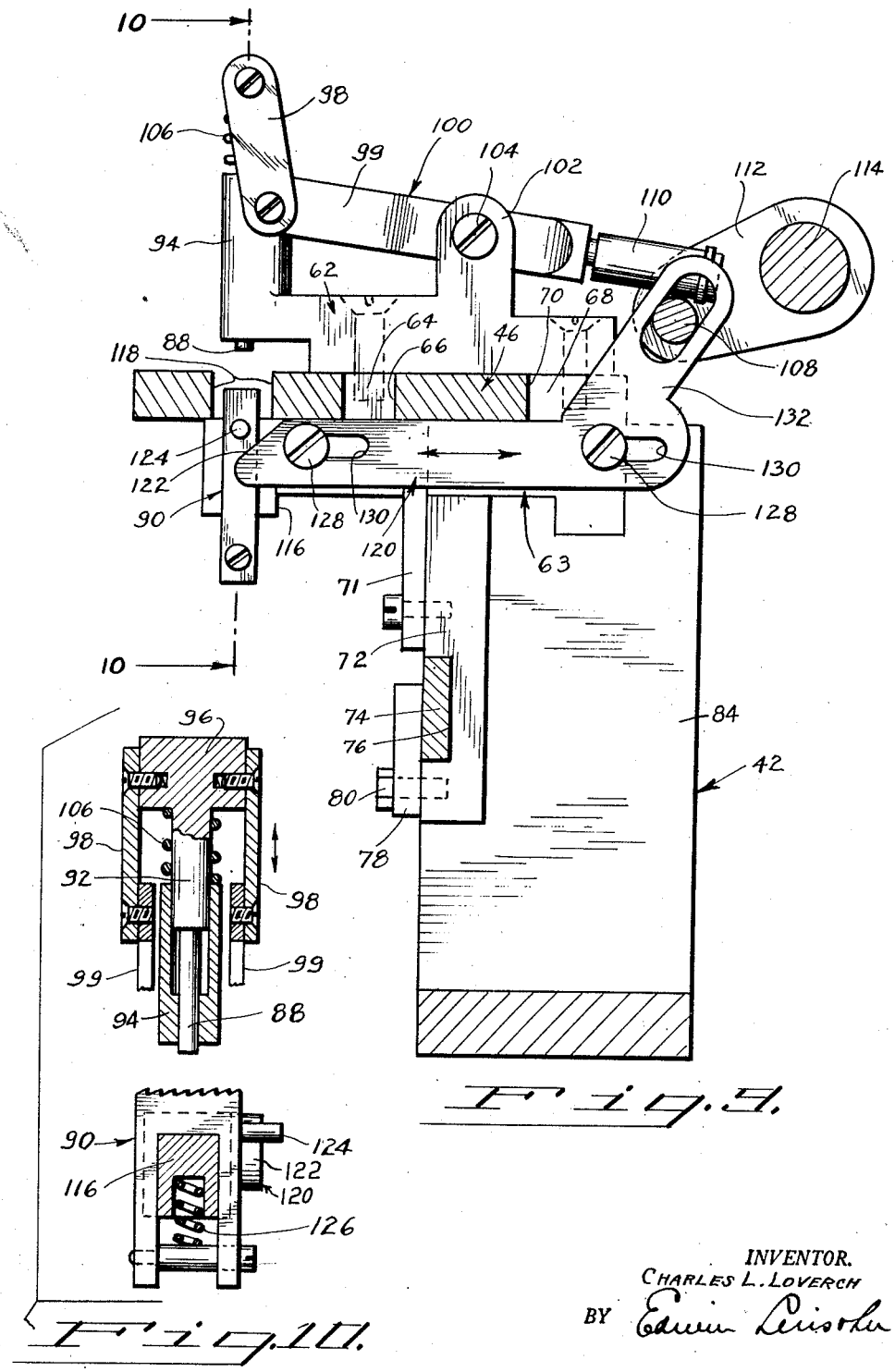

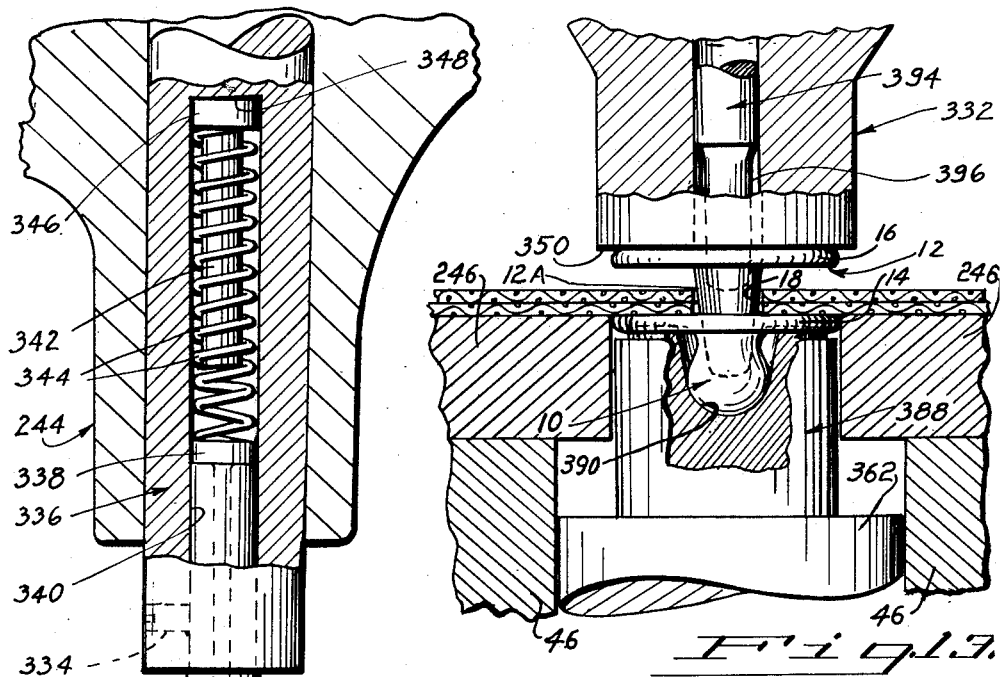
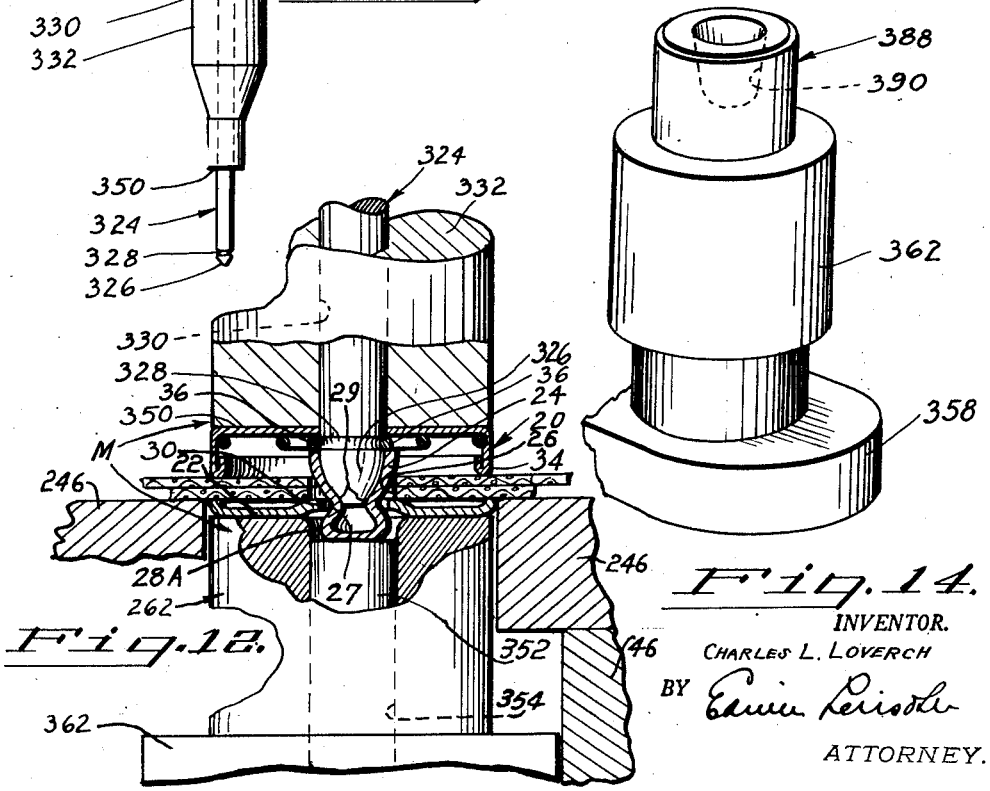

Dec. 19, 1950 — C. L. LOVERCH — 2,534,360
MACHINE FOR PERFORATING A TAPE, FEEDING IT, AND ATTACHING SNAP FASTENERS THERETO
Filed May 11, 1945

INVENTOR.
CHARLES L. LOVERCH
BY Edwin Leuster
ATTORNEY.

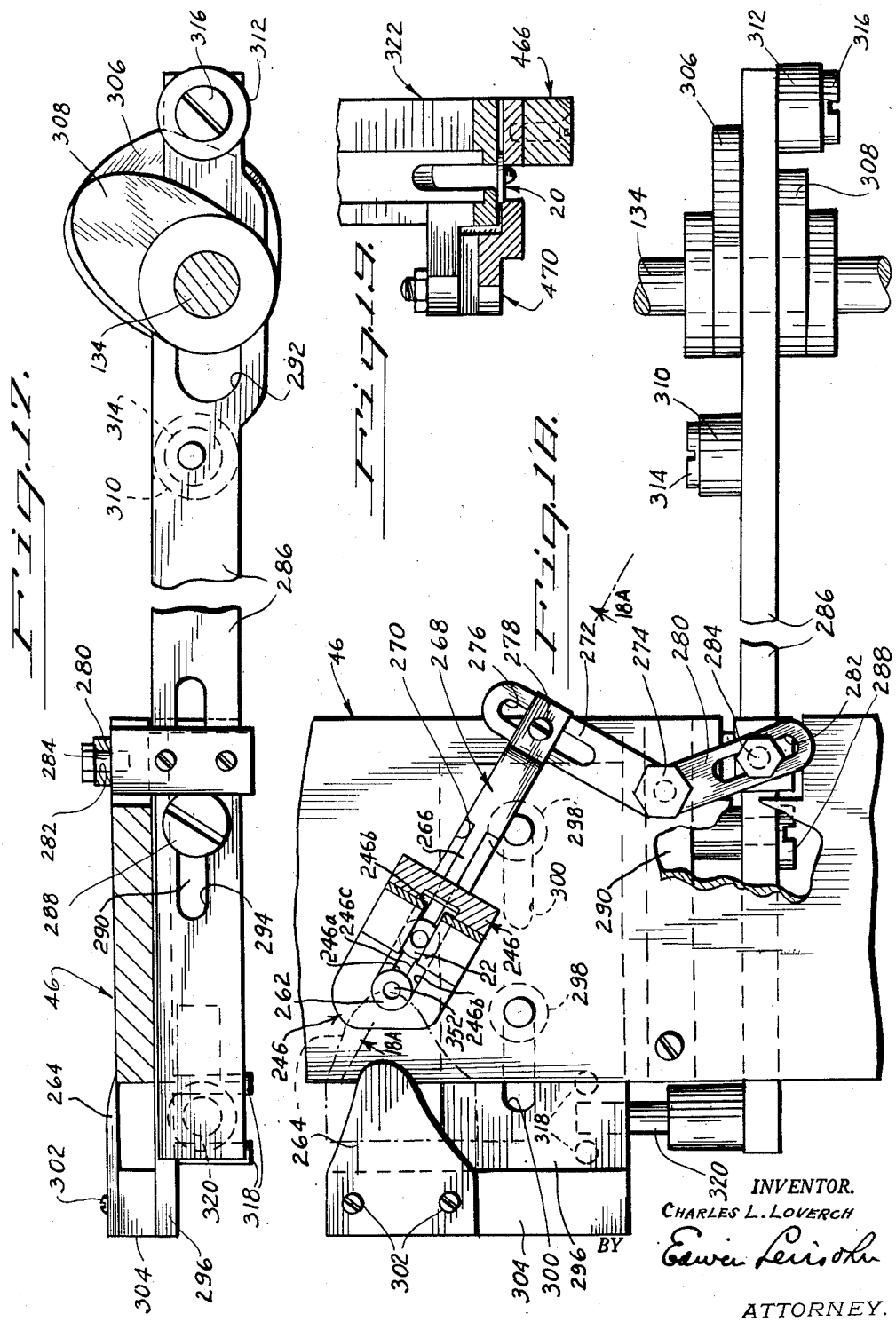

Dec. 19, 1950     C. L. LOVERCH     2,534,360
MACHINE FOR PERFORATING A TAPE, FEEDING IT,
AND ATTACHING SNAP FASTENERS THERETO
Filed May 11, 1945     12 Sheets-Sheet 11
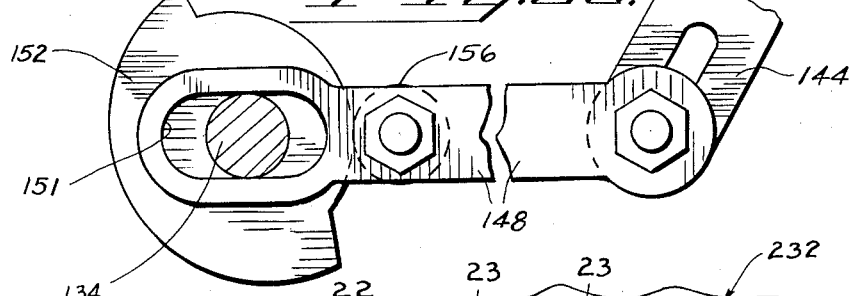
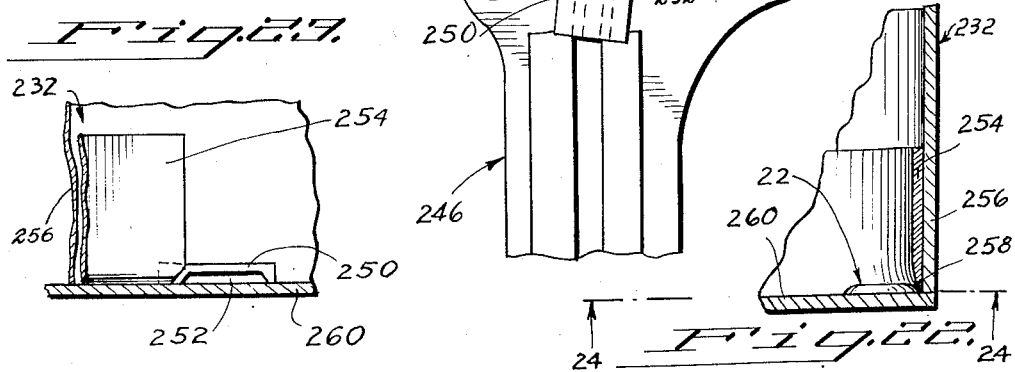
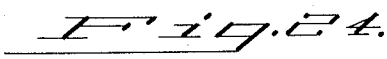
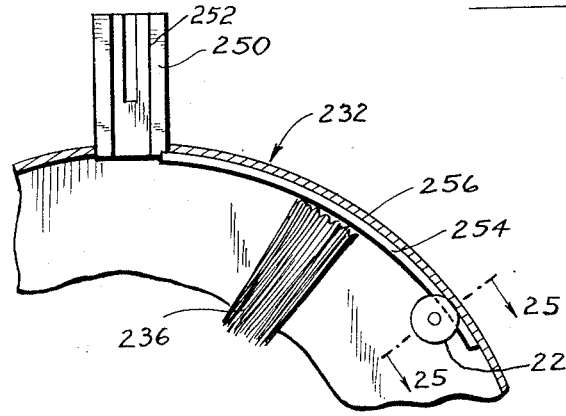
INVENTOR.
CHARLES L. LOVERCH
BY Edwin Leishur
ATTORNEY.

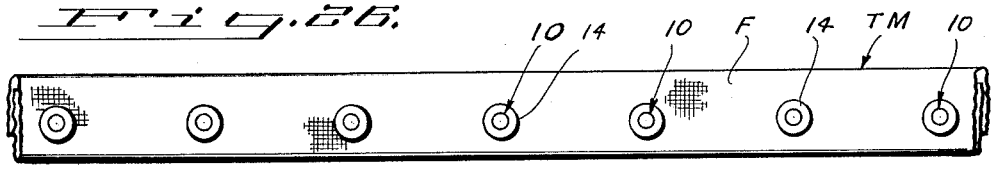
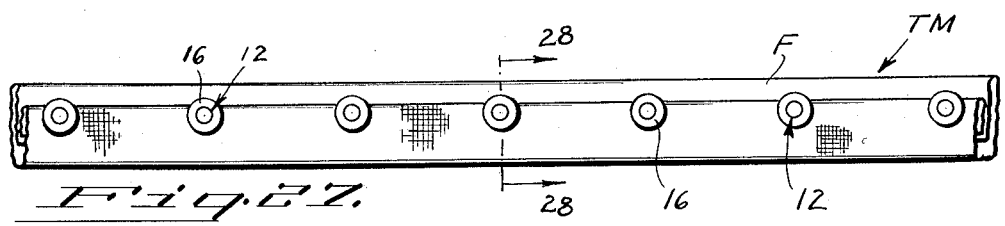
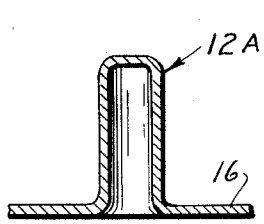
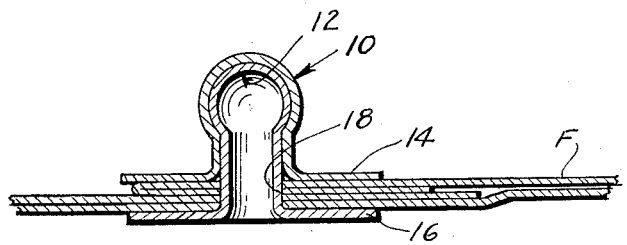
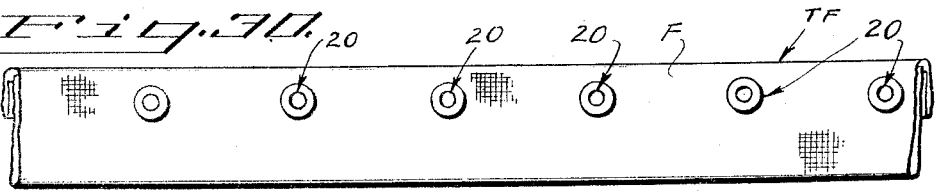
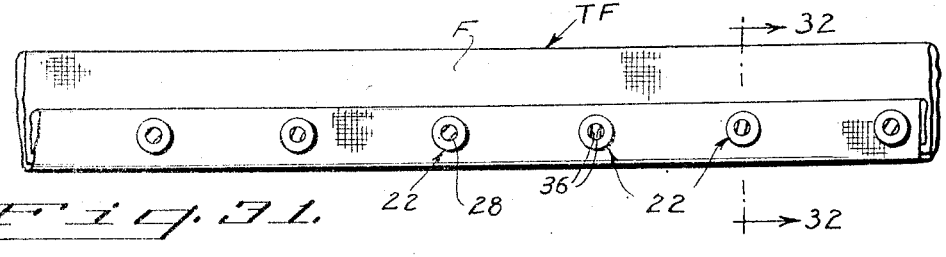
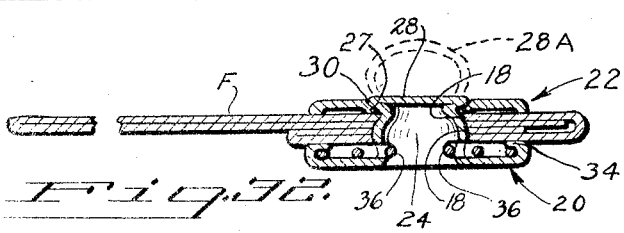
INVENTOR.
CHARLES L. LOVERCH
BY Edwin Levisohn
ATTORNEY.

Patented Dec. 19, 1950

2,534,360

UNITED STATES PATENT OFFICE 2,534,360

MACHINE FOR PERFORATING A TAPE, FEEDING IT, AND ATTACHING SNAP FASTENERS THERETO

Charles L. Loverch, Brooklyn, N. Y., assignor to Harry Alfandre, New York, N. Y.

Application May 11, 1945, Serial No. 593,293

9 Claims. (Cl. 218—6)

This invention relates to a machine for producing snap-fastener tape.

The primary object of the present invention is the provision of a machine for automatically attaching the companion parts of snap fastener elements to a tape in spaced relation thereon, the machine having a continuous operation and including means for feeding the tape in timed relation to the operation of the means for attaching the companion parts of the snap fastener elements thereto, whereby to produce in continuous fashion indefinite lengths of the snap-fastener tape.

Another object of the invention is the provision of a machine of the character described which is constructed so as to be operable for producing tape carrying either female snap fastener elements or the companion male snap fastener elements. More particularly, in accordance with this object of the invention, provision is made in the machine whereby the latter can be readily adapted, by the provision of simple replaceable parts for producing either the female snap-fastener tape or the male snap-fastener tape.

A further object of the invention is the provision of a machine of the character described which is so constructed in respect to the various parts and mechanisms thereof as to be efficient and reliable in operation.

The above and other objects, features and advantages of the invention will be fully understood from the following description considered in connection with the accompanying illustrative drawings.

In the drawings:

Fig. 1 is a front perspective view of a machine embodying the present invention;

Fig. 2 is a rear perspective view of part of the machine;

Fig. 3 is a side perspective view of part of the machine, looking at the left hand end of the machine as seen in Fig. 1;

Fig. 4 is a front perspective view of part of the machine;

Fig. 5 is a sectional view on the line 5—5 of Fig. 3;

Fig. 6 is a sectional view on the line 6—6 of Fig. 5;

Fig. 7 is a view of part of the mechanism at the line 7—7 of Fig. 4, with portions cut away for the purpose of illustration;

Fig. 8 is a sectional view on the line 8—8 of Fig. 7;

Fig. 9 is a sectional view on the line 9—9 of Fig. 1;

Fig. 10 is a sectional view on the line 10—10 of Fig. 9;

Fig. 11 is a sectional view on the line 11—11 of Fig. 4 when the machine is adapted for producing female snap-fastener tape;

Fig. 12 is a sectional view, on a larger scale, on the line 12—12 of Fig. 1, the machine being then adapted for producing female snap-fastener tape, and also showing on a larger scale part of the mechanism illustrated in Fig. 11 in the relation of the parts for attaching the companion parts of the female snap-fastener elements to the tape;

Fig. 13 is a view similar to Fig. 12, showing the parts adapted for producing male snap-fastener tape, however;

Fig. 14 is a perspective view of certain parts shown in Fig. 13;

Fig. 17 is a sectional view on the line 17—17 of Fig. 1;

Fig. 18 is a top plan view of the parts illustrated in Fig. 17;

Fig. 19 is a sectional view on the line 19—19 of Fig. 4;

Fig. 20 is a sectional view on the line 20—20 of Fig. 3;

Fig. 21 is a fragmentary top view of the hopper for the apertured disk parts of the female snap fastener elements;

Fig. 22 is a sectional view on a larger scale on the line 22—22 of Fig. 21;

Fig. 23 is a sectional view on a larger scale on the line 23—23 of Figs. 21;

Fig. 24 is a sectional view on the line 24—24 of Fig. 22;

Fig. 25 is a sectional view on a larger scale on the line 25—25 of Fig. 24;

Fig. 26 is a view of one side of the male snap-fastener tape produced by the machine of the present invention;

Fig. 27 is a view of the other side of the male snap-fastener tape;

Fig. 28 is an enlarged sectional view on the line 28—28 of Fig. 27;

Fig. 29 is a sectional view of one of the companion parts of the male snap fastener elements in the condition of said part before it is attached to the tape and the companion male snap-fastener;

Fig. 30 is a view of one side of the female snap-fastener tape produced by the machine of the present invention;

Fig. 31 is a view of the other side of the female snap-fastener tape;

Fig. 32 is an enlarged sectional view on the line 32—32 of Fig. 31, showing in dotted lines the end portion of the socket part of the female snap-fastener element before it is attached to the tape and the companion disk part of the female snap fastener element.

Figure 15:
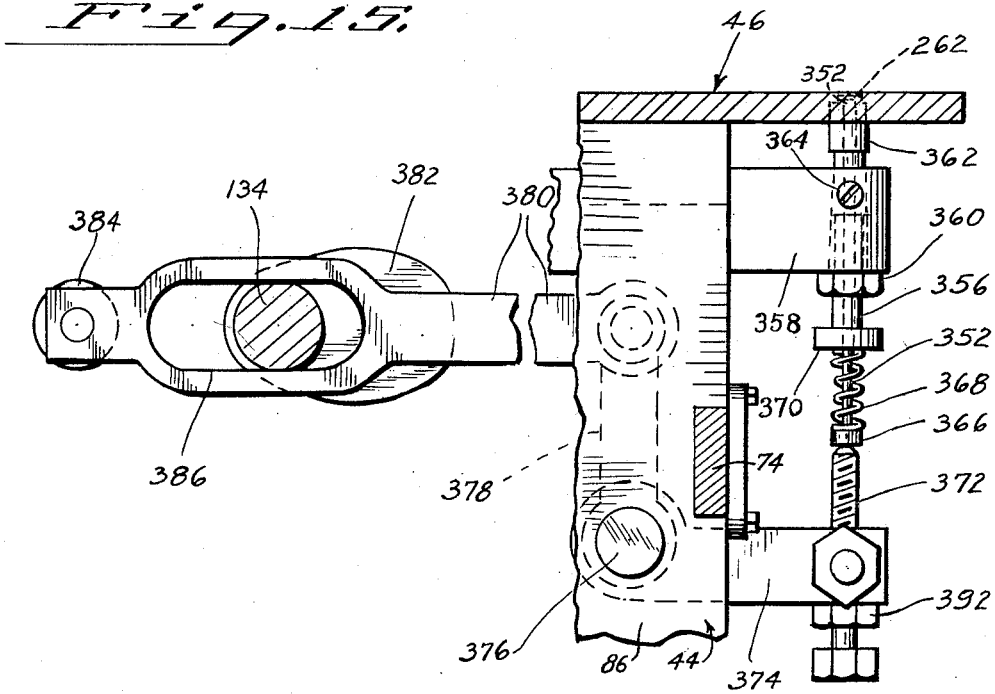
Fig. 15 is a sectional view on the line 15—15 of Fig. 3.

The male snap-fastener tape TM produced by the machine of the present invention comprises a length of fabric F folded upon itself into a plurality of plies (Figs. 26 to 28) and having attached thereto in spaced relation a plurality of male snap-fastener elements or studs, each of which includes an outer part 10 and an inner part 12, each having a hollow stem provided with flanges 14 and 16, respectively, between which the tape is clamped. The stem of the part 12 of the male snap fastener element extends through an opening 18 in the tape and is fitted into the hollow stem of the outer male snap fastener part 10, as illustrated in Fig. 28. Fig. 29 shows the cylindrical shape of the stem 12A of the inner part 12 of the male snap fastener element in the condition of said part before it is attached to the tape and to the companion male snap fastener part 10, and it will be noted that as a result of attaching the inner male snap fastener part 12 to the tape and to the companion male snap fastener part 10, the stem 12A is bent or upset from its originally cylindrical form (Fig. 29) to conform to the approximately spherical or rounded contour of the outer end portion of the stem of the companion part 10, this being accomplished in the operation of the machine of the present invention as will be subsequently described.

The female snap-fastener tape TF also comprises a length of fabric F folded upon itself into a plurality of plies (Figs. 30 to 32) and carrying the usual female snap fastener elements, each of which includes a socket member 20 and a disk member 22 between which the tape is clamped in the usual way, the socket member 20 having a hollow stem 24 which passes through an opening 18 in the tape. Fastener part 22 has the cross section illustrated in Fig. 25 and is provided with a central aperture 27 through which stem 24 projects. In the condition of socket member 20 before it is attached to the tape and to the companion disk part 22, the hollow stem 24 is of the elongated form indicated by the end portion 28A shown in dotted lines in Fig. 32, and in section in Fig. 12 and said stem is inwardly constricted between its opposite ends circumferentially therearound as indicated at 29 in Fig. 12. It will be understood that when the socket member 20 is attached to the tape and to the companion disk part 22 by the machine of the present invention, end portion 28A is flattened down and clenched, as indicated at 28 in Fig. 32, onto the inner marginal edge portion 30 of the companion apertured disk 22 around aperture 27 therein, thus clamping said disk and the flange 34 of socket part 20 to the tape. Each socket part 20 of the female snap fastener element is provided with the usual spring parts 36 for resiliently engaging the stud of the companion male snap fastener element with the usual snap action.

The machine for producing the female snap-fastener tape TF and the male snap-fastener tape TM or similar tapes will now be described. Said machine comprises a suitable support, such as a bench or table 38 (Fig. 1), on the top of which is mounted a plate 40 having secured thereto supports 42 and 44 to which is secured a rigid supporting plate 46. The fabric F, in non-folded condition, is drawn from a supply roll (not shown) through a conventional folder 48 (Fig. 1) and from the latter over the top of frame plate 46 longitudinally thereof through a guide member 50 adjacent the point or station at which the snap fastener elements are attached, and through guide and detent devices 52 and 54 (Figs. 1 and 4), mounted on and spaced longitudinally of frame plate 46. Each of the guide devices 52 and 54, underneath which the folded tape passes, has a pivoted plate 56 provided with a serrated edge 58 which engages the upper surface of the tape for preventing retractive movement thereof. As illustrated in Fig. 1, a heated pressing iron 60 is positioned between folder 48 and guide and detent device 52 for ironing and thereby sharply creasing the edges of the folded tape as it issues from the folder.

The folded tape is pulled intermittently longitudinally of frame plate 46 to and from the station at which the companion parts of the snap fastener elements are attached to the tape and to each other, the snap fastener elements being attached during the periods at which the tape is at rest between the successive feeding movements of the tape. The intermittently operable tape feeding means comprises a head 62 (Figs. 1 and 9) mounted for sliding movement on the top of frame plate 46 longitudinally thereof. A member 63 is positioned below frame plate 46 in slidable engagement therewith (Fig. 9) and has a part 64 thereof projecting upwardly through a longitudinal guide slot 66 in plate 46, which part is secured to head 62, said part having a sliding fit in slot 66 whereby head 62 and member 63 are guided for movement longitudinally of frame plate 46. Member 63 also has an upwardly projecting part 68 (Fig. 9) which is secured to head 62 and slidably engages the straight longitudinal rear edge 70 of frame plate 46, said part 68 being secured to said head 62. Member 63 is provided with a depending lug 71, and a bracket 72 is rigidly secured to and depends from said lug. A reciprocable actuating bar 74 is positioned in a groove 76 in bracket 72 (Fig. 9) and is securely attached to said bracket by a clamping member 78 fastened in position in any suitable way as by one or more screws 80. Bar 74 is mounted for longitudinal sliding movement in similar grooves in the front faces of ends 82 and 84 of support 42 (Fig. 1) and in ends 86 and 87 of support 44, being retained in said groove by straps such as shown in Figs. 1, 3 and 15. Upper and lower tape gripping members 88 and 90, respectively, in the head 62 and on a guide block 116, respectively (Figs. 9 and 10), are moved predetermined distances longitudinally of frame plate 46 by the reciprocatory bar 74 and are also reciprocated toward and away from each other, now to be described, for engaging the opposite sides of the tape for gripping the latter while said gripping members are moved longitudinally of frame plate 46, said gripping members being moved away from each other and thereby released from the tape after each feeding movement of the tape so that said gripping members may return to their initial positions longitudinally of frame plate 46, while being clear of engagement with the tape and with the fastener members following each feeding operation.

Gripping member 88 is fixed to a plunger 92 (Fig. 10) which is guided for reciprocation in a guide 94 on the head 62. The head 96 for the plunger 92 is connected by links 96 with the bifurcated ends 99 of a lever 100 which is pivoted in the bearing part 102 of the head 62 by a pivot screw 104. A spring 106 resiliently opposes the lowering of gripping member 88 toward the tape and urges said gripping member into its retracted position away from the tape (Fig. 9). Lever 100 is operated by an oscillatory bar 108 (see also Fig. 1) which engages said lever and is adapted to rock the same in a counter-clockwise direction, viewing Fig. 9, for projecting gripping member 88 into engagement with the tape. The end of lever 100, which is engaged by bar 108, is provided with a roller 110 to reduce friction between said lever and bar during the movement of lever 100 longitudinally of bar 108 when head 62 is reciprocated longitudinally of the frame plate 46. Bar 108 is fixed at its opposite ends in crank arms 112, mounted on an oscillatory shaft 114.

The lower gripping member 90 is mounted on the above-mentioned guide block 116 for movement in a longitudinal slot 118 in frame plate 46 toward and away from the companion gripping member 88 (Fig. 9). Guide block 116 is integral with or otherwise carried by member 63 for movement with the latter longitudinally of frame plate 46. Gripping member 90 is moved toward the companion gripping member 88 by a reciprocable bar 120 having a forward cam edge 122 engageable with a pin 124 fixed to said gripping member 90. A spring 126 (Fig. 10) opposes the movement of gripping member 90 to its projected position toward gripping member 88 and urges said gripping member 90 to its retracted position when the cam edge 122 of bar 120 releases pin 124. Bar 120 is mounted on member 63 and is guided for reciprocation laterally of frame plate 46 toward and away from gripping member 90 by pins 128 which are carried by member 63 and extend through slots 130, respectively, of said bar. It will be understood that bar 120 moves with head 62 longitudinally of frame plate 46, as well as transversely of frame plate 46 toward and away from gripping member 90. Said transverse movement of bar 120 is effected by the oscillatory bar 108 which extends through the upward slotted extension 132 of bar 120. Thus, when bar 108 is rocked clockwise, viewing Fig. 9, lever 100 is operated to lower or project gripping member 88, and bar 120 is operated to move forwardly of the gripper unit so that its inclined end 122 will raise or upwardly project gripping member 90. When bar 108 is rocked in a counter-clockwise direction, bar 120 is withdrawn from the gripping member 90 so that spring 126 is permitted to move said gripping member to its retracted position, while at the same time, spring 106 returns gripping member 88 to its retracted position and holds the outer end of said lever in engagement with bar 108.

Shaft 114 is oscillated from a rotary shaft 134 (Fig. 1) carrying a gear 136 which is in permanent mesh with a gear 138, fixed to the main driving pulley 140 which is connected by means of a belt 142 with an electric motor (not shown) or other means for operating the machine. The mechanism for oscillating shaft 114 from rotary shaft 134 comprises crank arms 144 and 146 fixed to shaft 114 (Fig. 3) and operated by links 148 and 150, respectively, each of which has a slotted end 151 (Figs. 2, 3 and 20) through which shaft 134 extends so that said links are guided for movement transversely of shaft 134. Cams 152 and 154, which are fixed to shaft 134 and rotated thereby, are engaged by rollers 156 and 158, respectively, on the links 148 and 150, respectively. The cams 152 and 154 are so coordinated with the parts 156, 148, 144 and 158, 150 and 146, respectively, that shaft 114 is oscillated positively in both directions. Rotary shaft 134 also is adapted to reciprocate bar 74 by which the head 62 is reciprocated longitudinally of frame plate 46. The mechanism provided for this purpose comprises a rotary transverse shaft 160 (Fig. 1) driven by shaft 134 through the meshing bevelled gears 162 and 164 fixed to shafts 134 and 160, respectively. Shaft 160 has a crank arm 166 connected by a link 168 to bar 74. Thus, when shaft 134 is rotated, actuating bar 74 is reciprocated and bar 108, which projects the tape gripping members (Fig. 9) 88, 90 toward each other and controls the retraction of said tape gripping members is oscillated in proper timed relation, to be described hereinafter, to the reciprocation of bar 74 whereby to intermittently move the tape to and from the station at which the snap fastener elements are attached to the tape, with an intervening rest period during which the tape is stationary for the attachment of the fastener elements or members thereto.

The machine includes means for punching the holes 18 through the tape at points spaced longitudinally thereof, for the reception of either the stems 12A of the male snap fastener parts 12 or the stem 24 of the female snap fastener parts 20. The hole punching means H comprises a head 170 (Figs. 3 and 5) slidably mounted on the top of frame plate 46 for movement longitudinally thereof. Head 170 is connected to a bracket and guide member 172 positioned below frame plate 46 in slidable engagement therewith. Member 172 is secured to head 170 in any suitable way as by screws 174 and 176. Said member 172 has a guide part 178 which slidably engages frame plate 46 in the longitudinal guide slot 180 therein (Fig. 5), and said member also has a guide part 182 which slidably engages the straight rear edge 70 of frame plate 46. A cylindrical punch 184 integral with or otherwise carried by a plunger 186 (Fig. 6) is mounted for reciprocation in the cylindrical guide 188 of head 170. Plunger 186, which carries punch 184, is reciprocated in guide head 188 by a forked lever 190, mounted for pivotal movement on head 170 by means of a pivot screw 192. The forked ends 194 of lever 190 are pivotally connected with links 196, respectively, and the latter are pivotally connected with the head 198 of plunger 186 (Figs. 4, 5, and 6). A spring 199 resiliently opposes the descent of plunger 186 as caused by lever 190, and aids in moving said plunger to its retracted position.

Punch 184 cooperates with a die 200 (Fig. 5) provided with a circular bore 202 which receives the end of the punch when the latter is projected through the tape for punching the holes therein. Said die is mounted for movement longitudinally of frame plate 46 in unison with head 170, and for this purpose is positioned in the part 204 of member 172 and carried by a screw 206 which is provided with a continuous longitudinal bore in alignment with the bore 202 of die 200. Said bore in screw 206 allows the punchings removed from the tape to be expelled from the die so as not to clog the same. Part 204, in which the die 200 is positioned, slidably engages frame plate 46 in longitudinal slot 208 therein, said slot constituting a guide for part 204. Screw 206 is removably secured to member 172 by a hollow screw 210 which is in threaded engagement with said screw and with member 172. A lock nut 212 is preferably provided on the screw 210. The screw 206 is, by virtue of its threaded engagement with the hollow screw 210, angularly adjustable in the latter. Member 172 is reciprocated longitudinally of frame plate 46 by bar 74, whereby head 170 is reciprocated in unison with head 62. Bar 74 is to this end secured in a groove 214 of a block 216 by a strap 218 (Fig. 5), and said block 216 is secured to the depending part 220 of member 172 in any suitable way as by one or more screws 222. Lever 190 is rocked positively in opposite directions on its pivot 192 for projecting and retracting punch 184. For this purpose the outer end of lever 190, which is provided with a roller 224, is engaged alternately by the oscillatory bars 226 and 228 (Fig. 3) disposed in laterally spaced relation. Said oscillatory bars 226 and 228 are secured at their opposite ends in crank members 230 fixed to and oscillated by shaft 114. By the means thus provided for operating punch 184, a hole is punched in the tape while the latter is moved longitudinally of frame plate 46 by the above described tape-feeding means, and punch 184 is preferably projected through the tape at the start of each feeding movement thereof, said punch remaining in the tape until about the end of said feeding movement. It will be understood that at or near the end of the tape-feeding movement, the punch is withdrawn from the tape to allow the return movement of head 170 which carries the punch.

The two parts of each snap fastener element are attached to the tape at a hole punched therein, this operation being performed while the tape is intermittently stationary. The machine will first be described with reference to the attachment of the companion parts 20 and 22 of the female snap fastener elements. The companion parts 20 and 22 of the elements are supplied from hoppers 232 and 234, respectively, of the rotary brush type, the apertured disks 22 being supplied from hopper 232 (Figs. 1, 2, 22 and 23), and the socket parts 20 being supplied from hopper 234 (Figs. 2 and 3). One of the rotary brushes with which each hopper is provided is indicated more or less diagrammatically at 236 in Fig. 24, further illustration being considered unnecessary since hoppers of the brush type are well known and do not per se form part of the present invention, except in the respect hereinafter explained. Hopper 232 is stationary, being mounted in any suitable way to any fixed part of the frame, for example, to the top of the bracket 238 (Fig. 1) which is mounted at 240 on a plate 242 that is in turn, suitably mounted on the side of head 244 which is mounted on the frame 40. A chute or raceway 246 extends downwardly from the bottom of hopper 232 to the station at which the parts of the snap fastener elements are attached to the tape (Figs. 1, 2 and 4). By reference to Fig. 2, it will be noted that raceway 246 has an upper curved part 248, the upper end of which communicates with the outlet of the hopper. Accordingly, while the snap fastener element parts 22 leave the hopper 232 in inverted position, that is in the position illustrated in Fig. 25 in which the concave side of part 22 is lowermost, said parts are in upright position in the part of the raceway forwardly of curved part 248 thereof, or forwardly of bracket 238 (Fig. 1), thus reaching the station of attachment in upright position as illustrated in Fig. 12.

In accordance with the present invention, hopper 232 is provided with means to prevent the parts 22 from leaving the hopper except in the referred to inverted positions thereof. For this purpose, the hopper has an outlet member 250 (Figs. 21 and 23) provided with an outlet opening 252 which has a size and shape corresponding to the cross section of inverted part 22 at the diameter thereof (Fig. 23) so that parts 22 can pass through outlet opening 252 only when they are in inverted position. It will be understood that only one part 22 can pass through opening 252 at one time. A guide member 254 is provided at the inner surface of peripheral wall 256 of the hopper 232 in a portion thereof which leads to the hopper outlet. The lower edge of guide member 254 is bevelled or cut away as indicated at 258 (Figs. 22 and 25), providing a space at the peripheral edge of the bottom 260 of the hopper adjacent the lower edge of the inner surface of peripheral wall 256, into which correctly positioned parts 22 project while being brushed toward the hopper outlet 252. Thus the peripheral edges of the correctly positioned parts 22 are disposed closer to the hopper outlet 252 while on the other hand, when parts 22 are in upright or incorrect position on the bottom 260 of the hopper, as said parts approach the hopper outlet 252, they are spaced inwardly of said outlet by the guide member 254 and are brushed past said outlet 252 in the direction of rotation of brush 236, thus leaving the hopper outlet 252 clear for the access of inverted parts 22 to said outlet, so that said inverted parts are brushed through said outlet.

Figure 18A:
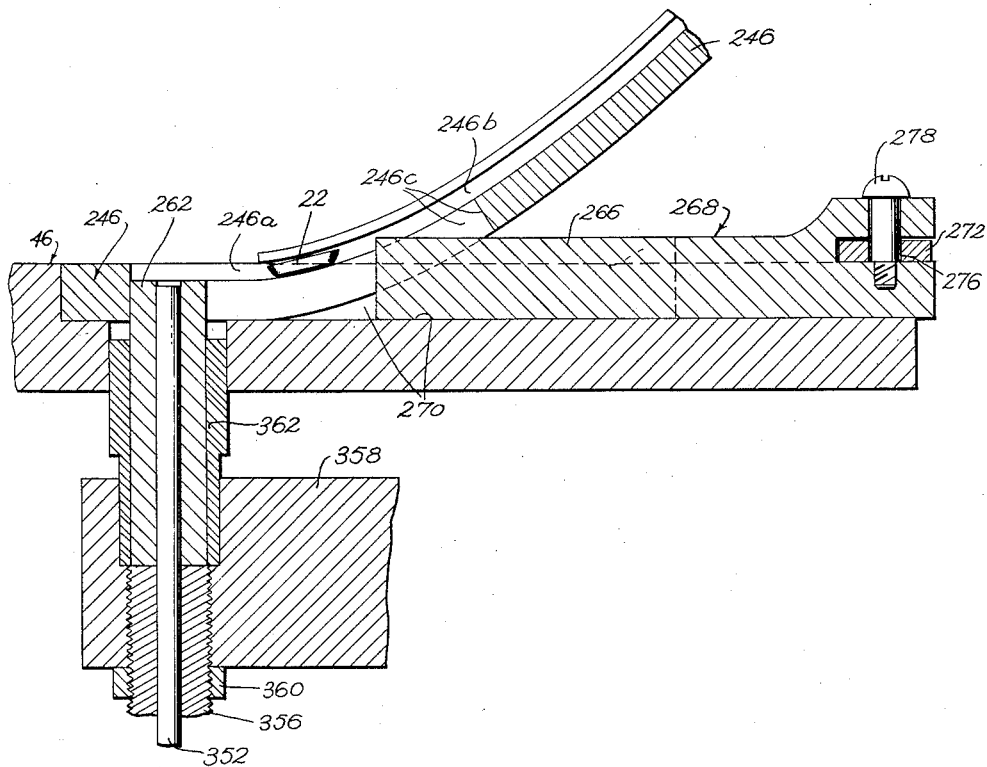
Fig. 18A is a fragmentary section taken on the line 18A—18A of Fig. 18.

The lower or discharge end of raceway 246 is positioned as shown at 246a in Fig. 18A, i. e., at the fastener-element attaching station at which an anvil member 262 is located (Figs. 4, 12 and 18), and the guide groove 246b in the base plate of the raceway 246 extends to the front edge of member 262 and surrounds the same in the fashion shown in Figs. 18 and 18A. Parts 22 are individually discharged from raceway 246 under the control of mechanism hereinafter to be described, said parts being deposited individually and positioned at the top of member 262 below the tape at the hole punched therethrough (Fig. 12). To aid in properly positioning each part 22 on member 262 as said part 22 leaves the raceway 246, or if said part should come to a stop in the position at the discharge end 246a of the raceway as shown in Fig. 18A, finger members 264 and 266 (Figs. 4 and 18) are provided. Member 266 is arranged to engage part 22 when it is at the end of the raceway (Fig. 18A) for pushing part 22 onto member 262, and member 264, being beveled at 265 (Fig. 17) moves underneath the adjacent tape and over said part 22 to prevent the latter from jumping from the end of the guide groove 246b above member 262 (Figs. 4 and 18A). Finger members 264 and 266 are reciprocated toward and away from each other, said finger members being moved clear of the opposite side edges of the tape after they are operated accurately to locate a part 22 on member 262. Finger 266 is integral with, or carried by, a bar 268 mounted for sliding movement in a guide groove 270 in the top of frame plate 46 (Figs. 18, 18A and 4). The finger 266 itself is also guided in a narrow slot 246c in the bottom of the raceway (Fig. 18A). Bar 268 is connected to one arm 272 of a bell crank lever mounted for pivotal movement on the top of frame plate 46 by means of a pivot screw 274. The outer end of arm 272 is provided with a longitudinal slot 276 in which a pin 278, carried by the outer end of bar 268, projects, said pin being movable longitudinally of said slot during the pivotal movement of the bell crank lever for reciprocating bar 268 and finger 266 thereof. The other arm 280 of the bell crank lever is provided with a longitudinal slot 282 in which slides a pin 284 fixed to the transverse reciprocable actuating bar 286. Said bar 286 is mounted for sliding movement on shaft 134 (see also Fig. 17) and on the shank of a pin 288 projecting from a supporting member 290 (Fig. 18) secured to the bottom of frame plate 46. Bar 286 is provided with slots 292 and 294 (Fig. 17) to allow said bar to reciprocate transversely of shaft 134 and pin 288. Finger member 264 is carried by a reciprocable plate 296 (Figs. 4 and 17) mounted for sliding movement at the bottom of frame plate 46 on pins 298 fixed to said frame plate 46, said plate 296 having grooves 300 to allow movement of said plate transversely of the shanks of said pins 298 which extend through said slots. As shown, finger 264 is fastened in any suitable way, as by screws 302, to the top of a spacer block 304 so that said finger is slidable on the top of frame plate 46 (Figs. 4 and 17). The mechanism for reciprocating bar 286 comprises cams 306 and 308 (Figs. 17 and 18) fixed to and rotated by shaft 134 and engageable with rollers 310 and 312, respectively, said rollers being mounted for rotation on shouldered screws 314 and 316, respectively, secured to and projecting laterally from the opposite sides of bar 286. Plate 296, which carries finger 264, is reciprocated by bar 286 in unison with the reciprocation of finger 266, and for this purpose, said plate 296 is provided with spaced depending fingers 318 (Figs. 4, 17 and 18) which are engaged by a laterally projecting pin 320 carried by the front end of bar 286.

The socket parts 20 of the female snap fastener elements are supplied from the hopper 234 moving from the latter down the raceway 322 to the discharge end thereof (Fig. 4) where the foremost part 20 is yieldingly held against removal from the raceway 322 in a manner described hereinafter. These snap fastener element parts 20 are removed, one at a time, and in a manner described hereinafter, from the lower or discharge end of the raceway by a pin or spindle 324, and are projected through the hole in the tape and through the aperture in the companion disk-like part 22 of the female snap fastener element (Fig. 12). Pin 324, shown in detail in Fig. 11, is provided with an end portion 326 to conform to the shape of a portion of socket part 24 of a part 20 (Fig. 12), and a peripheral groove 328 is provided in the end of pin 324 to receive the spring portions 36 of snap fastener element part 20 (Fig. 12). Pin 324 is slidable in a bore 330 provided in a tubular stem 332 (Fig. 11) removably fixed by a set screw 334 or in any other suitable way to the hollow reciprocable plunger 336 (Figs. 1 and 11). The upper end of pin 324 is provided with a head 338 which is slidable in a bore 340 of plunger 336. A stop pin 342 is positioned in said bore and a compression spring 344 engages the head 346 of pin 342 and holds the latter against the upper end 348 of said bore, said spring also engaging the head 338 of spindle 324 for resiliently opposing upward movement of the latter in bore 330 of stem 332. The upward movement of spindle 324 against the action of spring 344 is limited by the engagement of the head 338 of said spindle with the lower end of stop pin 342.

When the plunger 336 descends, spindle 324 impales the lowermost element part 20 at the discharge end of the raceway, as hereinafter described, and thereafter, as the plunger continues to descend, projects the stem of part 20 through the aligned opening 26 in the tape and through the aperture 27 in the companion element part 22 on the member 262, whereupon the lower end 350 of stem 332 moves into engagement with part 20 (Fig. 12) and holds the latter clamped tightly against the tape without, however, forcing spindle 324 downwardly beyond the socket forming portion 24 (Fig. 12), since spindle 324 yields longitudinally of stem 332. This position of the parts is illustrated in Fig. 12. In this position of the parts, however, the head 338 of the spindle 324 is, or is about, in engagement with the stop pin 342, wherefore said spindle 324 is then at the inner limit of its yielding movement relative to the stem 332. When the parts are thus positioned, a plunger 352 (Fig. 12) reciprocable in the bore 354 of member 262 is operated to upset the end portion 28A of element part 22 and clench the same into engagement with the inner marginal edge portion 30 of the companion element part 22. Plunger 352 is operated by a mechanism illustrated in Fig. 15. As shown in Figs. 15 and 18A, plunger 352 extends downwardly through member 262 and through a guide member 356 threaded into, and thereby secured in, a supporting bracket 358 positioned below frame plate 46, said guide member 356 being further secured by a lock nut 360. Member 262, on which parts 22 are successively positioned as described above, is mounted in a support 362 (see also Fig. 18A) which is removably secured in bracket 358 by a set screw 364 (Fig. 15). The lower end of plunger 352 is provided with an abutment collar 366 which is engaged by one end of a spring 368, the opposite end of which engages a collar 370 on guide member 356. Spring 368 moves plunger 352 downwardly to its retracted position and resiliently opposes the projection of said plunger by pin 372, collar 366 of plunger 352 being constantly in engagement with the adjacent end of said pin 372. Said pin 372 is carried by an arm 374 fixed to a rock shaft 376 which is mounted in a suitable bearing below frame plate 46 and extends longitudinally thereof. Rock shaft 376 is provided with an actuating arm 378 to which a transverse reciprocable bar 380 is pivotally connected. Bar 380 is operated in one direction by a cam 382, fixed to and rotated by shaft 134, said cam being engageable with a roller 384 carried by said bar 380. A slot 386 is provided in bar 380 to allow the latter to move transversely to shaft 134. When bar 380 is moved to the left, viewing Fig. 15, arm 374 is operated to project plunger 352 against the pressure of spring 368 for flattening portion 28A of snap fastener element part 20 and clenching the same against the companion element part 22, thus completing the attachment of element parts 20 and 22 to each other and to the tape. Thereafter cam 382 moves out of engagement with follower roller 384 and allows spring 368 to retract plunger 352.

When the parts 10 and 12 of the male snap fastener elements are to be attached to the tape for forming male snap-fastener tape, supporting member 262 (Figs. 12 and 15) is removed from holder 362, and inserted and firmly secured in the latter by the set screw 364 is a die 388 (Fig. 13) having a socket 390 shaped to the contour of the rounded end of the stem or stud of male snap fastener part 10. Also, plunger 352 and spring 368 (Fig. 15), used in attaching the female snap fastener part 20 to the tape and to the companion snap fastener part 22, are removed, this being permitted by the retraction of threaded pin 372. It will be understood that the male snap fastener parts 10 are supplied from a hopper and raceway mounted in the positions of hopper 232 and raceway 246 (Figs. 2 and 4), said hopper and raceway for parts 10 being substantially the same as hopper 232 and raceway 246 except that the hopper for parts 10 is not provided with the special outlet 250 and guide 254 (Figs. 21 and 23) provided in the hopper for parts 22. Hoppers of the rotary brush type and raceways for elements having a shank and a flange are well known and therefore need not be described as they do not in themselves form parts of the present invention. The hopper and raceway for parts 12 of the male snap fastener elements are supplied from a hopper and raceway mounted in the positions of hopper 234 and raceway 322. Further exchange of parts in the machine for forming male snap fastener tape TM (Figs. 26 and 28) is undertaken as follows. Spindle 324 is removed from stem 332 (Figs. 11 and 12) and is replaced by spindle 394 (Fig. 13) which has an end portion 396 shaped to fit within the hollow stem 12A of the male snap fastener part 12. When spindle 394 is used, the abutment pin 342 (Fig. 11) is removed from the plunger 336 so as not to limit the upward movement of spindle 394 against the spring 344 in the bore 340 of said plunger 336. When the plunger 336 descends end portion 396 of spindle 394 impales a snap fastener part 12 at the discharge end of the corresponding raceway, and as the plunger continues to descend stem 12A of part 12 is projected by spindle 394 through the opening 18 in the male snap-fastener tape, and upon the completion of the downward stroke of said plunger 336 the lower end 350 of stem 332, through engagement with the flange 16 of part 12 (Fig. 13), forces stem 12A into the hollow stem of the companion snap fastener part 10 in socket 390 of the die 388 and upsets and shapes the outer end portion of stem 12A to conform the same to the inner surface of the rounded end portion of the hollow stem of snap fastener part 10, and at the same time the flange 16 of snap fastener part 12 and the flange 14 of the companion snap fastener part 10 are clamped against the opposite sides, respectively, of the tape (Fig. 28).

Figure 16:
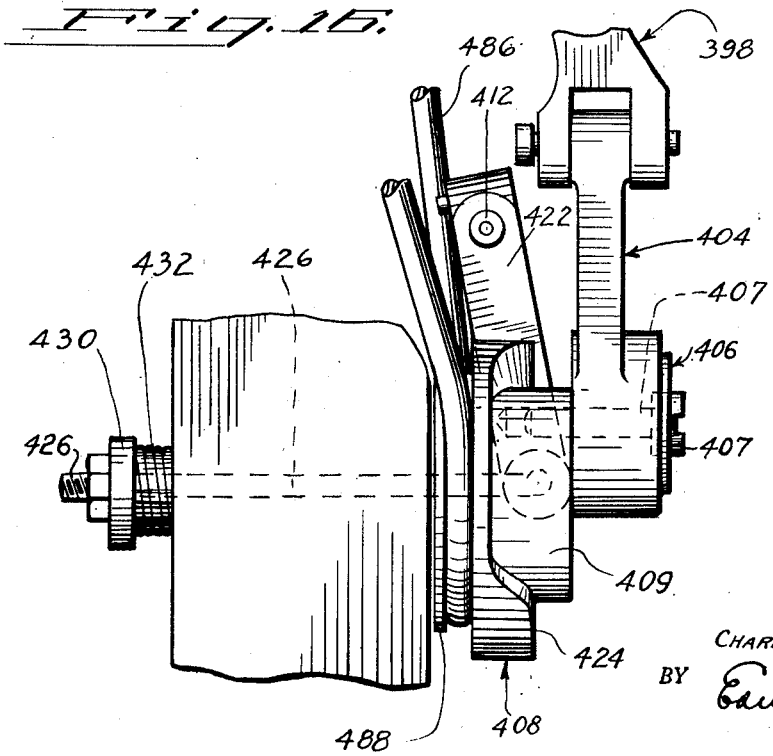
Fig. 16 is a rear view of part of the machine as seen along the line 16—16 of Fig. 3.

Plunger 336 which may interchangeably carry spindle 324 or 394 in the secondary plunger 332, as explained (Figs. 11 and 13), is actuated by a lever 398 (Figs. 1, 2 and 3) pivotally mounted for oscillation on a pivot 400 carried by the head 244 of the machine. The forward end of lever 398 is pivotally connected by means of links 402 to the upper end of plunger 336 which is axially slidable in the head 244 of the machine. The opposite end of lever 398 is pivotally connected with a rod 404 which is driven by an eccentric pin 406 (Figs. 2 and 3) on a rotary disk 408 on a shaft 410 (Figs. 1 and 2) driven by pulley 140. Eccentric pin 406 is mounted by means of a screw 407 on a central projection 409 of the disk 408, the axis of said screw 407 being eccentric of the axis of rotation of disk 408. Disk 408 also operates a rock shaft 412 (Figs. 2 and 3) which is mounted in a bearing 414 carried by the machine head 244, one purpose of shaft 412 being to pivotally move raceway 322 about its pivot mounting 416 (Fig. 2) in timed relation to the operation of plunger 336 for moving the discharge end of raceway 322 out of the path of said plunger 336 as the latter descends after a snap fastener part (20 or 12) in the lower end of said raceway is engaged by spindle 324, or spindle 394 when the former is replaced by the latter. An arm 418 is fixed to the forward end of rock shaft 412 (Fig. 2) and carries a follower 420 which engages raceway 322 for thus pivotally moving said raceway. Raceway 322 is held by the force of its own weight against follower 420 of arm 418, so that it follows said arm 418 when the same is turned in a direction to allow the return of the discharge end of the raceway to a point below spindle 324 or spindle 394, whichever is carried by plunger 336. An actuating arm 422 is fixed to the rear end of rock shaft 412 (Figs. 2 and 3) and engages the cam face 424 of rotary disk 408 (see also Fig. 16), said cam face being formed on the margin of the disk around projection 409 thereof. The end of arm 422 is held resiliently in engagement with the cam disk face 424 by a rod 426 which projects through a slot 428 in the machine head 244 (Fig. 3) and has a collar 430 which is engaged by a compression spring 432 (Fig. 16). Rod 426 is connected to arm 422 by means of an eye 438 (Fig. 3) formed on the end of said rod and fastened by a screw 440 and a retaining nut 442 to the end of the arm 422.

Referring now again to raceway 246 (Fig. 2), provision is made as hereinbefore indicated to allow only one snap fastener element 10 or 22, as the case may be, to be discharged from the raceway during each cycle of operation of the machine. For this purpose, the raceway is provided with the control device 444 (Figs. 4, 7 and 8). Said device comprises a plate 446 mounted for reciprocation transversely of the raceway 246, plate 446 being slidable in a groove 448 provided in a holding member 450 (Fig. 8) suitably fastened to the back of the raceway. Said plate 446 carries a pair of stop pins 452 and 454, respectively, which reciprocate in bores 456 and 458, respectively, in the raceway, into and out of the path of parts 10 or 22 in the raceway, each of said pins, when in the projected position thereof, extending into the longitudinal slot 460 of the raceway, and being clear of said slot when said pins are in their respective retracted positions. It will be understood that a series of the snap fastener element parts 10 or 22 are discharged into the raceway 246 from their respective hoppers, and gravitate therein as far as pin 452 (Fig. 7), the discharge of the snap fastener element parts downwardly beyond said pin 452 being controlled by device 444. In this connection it will be understood that when plate 446 is moved to the left, viewing Fig. 7, the lowermost snap fastener element part on top of the pin 452 in the raceway is disengaged and thereby released by said pin 452 so that it can move to the discharge end of the raceway, and that during this movement of plate 446, pin 454 is moved to its projected position and thereby prevents the next lowermost snap fastener element parts from moving down the raceway. On the other hand, when plate 446 is moved to the right, pin 454 is retracted and pin 452 is projected so that the lowermost fastener element part in the raceway is positioned to be released upon the next movement of plate 446 to the left, as will be readily understood. Plate 446 is reciprocated in proper timed relation to the operation of the machine by a link 462, pivotally connected at one end thereof to plate 446 and pivotally connected at its opposite end to an arm 464 (Figs. 2 and 3) fixed to rock shaft 412.

Either fastener part 20 or 12 is removed by the spindles 324 and 394, respectively, from the discharge end of the raceway 322, in that the descending spindle first impales the respective fastener part while the latter is still in the discharge end of the raceway, and the impaled fastener part is removed from the raceway and is carried downwardly on the spindle when the raceway has sufficiently retracted from the spindle to clear the fastener part impaled on the latter.

In accordance with the present invention, provision is made for preventing the accidental removal of a snap fastener part 12 from spindle 394 after the former is impaled on the latter and removed from the discharge end of raceway 322, as above described. For this purpose, one side of the discharge end of the raceway 322 carries a block 466 (Figs. 2, 4 and 19), having a downwardly inclined face 468 (see particularly Fig. 4) which engages the flange of the impaled part 12 and acts to force it onto the spindle with sufficient force to prevent its dropping from the latter after the snap fastener part clears block 466 on continued descent of the spindle 394. To this end also, the raceway 322 is, under the control of the cam face 424 of the disk 408 (Fig. 2), retracted from the descending spindle 394 at a speed related to the speed of descent of the spindle 394 and the inclination of the face 468 so that the inclined face 468 of the block 466 on the raceway performs the above-described function of forcing the impaled part 12 more firmly on the descending spindle 394.

When the machine is set for the production of female snap fastener tape TF (Figs. 30 to 32), the raceway 322 discharges snap fastener parts 20 (Figs. 12 and 32) which carry the spring elements 36. In that case, the spindle 324 will be at its groove 328 (Fig. 12) become yieldingly interlocked with the spring elements 36 of each snap fastener part 20 as it impales the same at the discharge end of the raceway 322 for its described removal from the raceway. Hence, block 466 at the discharge end of the raceway 322 is not needed in any way when the machine produces female snap fastener tape TF, though this block 466 need not be removed from the raceway 322 for the production of female snap fastener tape TF, as it interferes in no wise with the correct performance and cooperation of the raceway 322 and spindle 324.

A pivoted retaining member 470 is provided at the lower end of the raceway 322 for resiliently retaining the snap fastener parts 20 or 12, as the case may be, in the discharge end of the raceway until they are removed, as above explained, by the respective spindles on the plunger 336. A spring 472 (Fig. 4) engages one end of the retaining member 470, which is pivotally mounted intermediate its ends on a pivot 474 on the raceway 322, and holds the opposite end of member 470 resiliently in engagement with the lowermost fastener parts in the discharge end of the raceway (Fig. 19) until the foremost fastener part therein is removed from the raceway by the corresponding spindle on the plunger 336.

The rotary brushes 236 for the hopper 232 are rotated by a pulley 476 (Fig. 1) connected to a driving pulley 478 by a belt 480 which passes also over guide pulleys 482. The rotary brushes for hopper 234 are rotated by a pulley 484 (Fig. 2) driven by a belt 486 connected to a pulley 488 (Fig. 16), guide pulleys 490 and 492 (Fig. 2) being provided for said belt. Driving pulleys 478 (Fig. 1) and 488 (Fig. 16) are fixed to and are driven by shaft 410 which is driven by the main drive pulley 140.

The operation of the machine is as follows. Main driving pulley 140 (Fig. 1) is maintained in continuous rotation by the belt 142 leading to a motor (not shown). This maintains shaft 134 in continuous rotation. Shaft 134, through gearing 162, 164 maintains crank 166 in continuous rotation. The tape feeding means 88, 90 (Figs. 1 and 9) intermittently pulls the tape material F from a supply roll (no shown) through the folder 48 (Fig. 1), then underneath the heated pressing iron 60 which sharply creases the edges of the folded tape, and then over the frame plate 46 past the fastener setting station at which the companion parts of the snap fastener elements are attached to the tape and to each other.

The tape feeding means 88, 90 are reciprocated longitudinally of the frame plate 46 for intermittent advances of the tape on the frame plate. To this end, the feeding means is drivingly connected through head 62, member 68, clamping member 70 and actuating bar 74 (Fig. 9) with the power-driven crank 166 (Fig. 1) through intermediation of the bar 74 (Fig. 9) and link 168 (Fig. 1). Substantially at the start of a forward or feed stroke of the feeding means 88, 90 in the direction of the arrow 95 in Fig. 1, said feeding means 88, 90 are forced into gripping engagement with the finished tape F between attached snap fastener elements thereon, this being accomplished by the bar 108 (Fig. 9) which is carried by the crank arms 112 on the rock shaft 114 (Fig. 1) that is rocked back and forth through its connection with the driven shaft 134 (Fig. 3). This connection comprises the cams 152 and 154 on shaft 134, the followers 156 and 158, the links 148 and 150, and the crank arms 144 and 146 on shaft 114. The feeding means 88, 90 are, substantially at the start of a feed stroke thereof, forced into gripping engagement with the tape F when the bar 108 is, by the action of the cams 152 and 154, rocked clockwise as viewed in Fig. 9, whereby feeding means 88 is lowered into engagement with the tape F through intermediation of level 100, links 98 and plunger 92, and feeding means 90 is raised into engagement with the tape F through intermediation of bar 120 and pin 124 on said means 90. The cams 152 and 154, which cause the rocking of the bar 108, are so designed that bar 108 remains in the angular position into which it has been rocked, until the feeding means 88, 90 reach substantially the end of their feed stroke, during which time the feeding means 88, 90 remain in gripping engagement with the tape F. Thereafter bar 108 is, by action of the cams 152 and 154, rocked back into the position shown in Fig. 9, whereby the feeding means 88, 90 are returned to their retracted positions away from the tape for their return stroke longitudinally of the frame plate 46 by bar 74.

While the tape F is intermittently fed forwardly by the tape feeding means 88, 90, the folded tape F is subjected to a punching operation from the hole-punching means generally designated H in Figs. 1, 2, 3 and 5. The action of the hole-punching means 184, 200 (Fig. 5) upon the tape F is as follows. The hole punch 184 is operated from the bars 226 and 228 (Fig. 3) through intermediation of lever 190 and links 196. More particularly, the operative or hole-punching stroke of the punch 184 is accomplished by the oscillating bar 226 substantially at the start of a forward or feed step of the tape F, and the punch 184 is not withdrawn from the tape F until substantially the end of the feed step of the latter, the cams 152 and 154, which control the oscillation of shaft 114 that carries the bars 226 and 228, being accordingly coordinated with the crank 166 which, through intermediation of the actuating bar 74, connected to the punching means by strap 218 (Fig. 5), controls the movement of the tape-feeding means 88, 90 and of the hole-punching means 184, 200 longitudinally of the frame plate 46.

As earlier mentioned, the tape F has a rest period between intermittent feed steps thereof, i. e., while the tape feeding means 88, 90 and the hole-punching means 184, 200 are returned, oppositely to the direction of arrow 95 in Fig. 1, to their respective starting positions for the next advance of the tape F. During each of these rest periods of the tape F, the companion parts 20 and 22 (Fig. 32) of the female snap fastener elements, for instance, are, by the attaching means generally indicated M in Figs. 1, 2, 3, 4 and 12, attached to each other and to the tape F at a hole previously punched therein by the hole-punching means 184, 200. Prior to the operation of the attaching means M the lowermost part 22 of the female snap fastener elements in the raceway 246 is released therein for gravity descent toward the member 262 (Figs. 4, 12 and 18A) on retraction of the pin 452 (Figs. 7 and 8) from the slot 460 in the raceway 246 by the action of the cam disk 408 and through intermediation of the arm 454 on the rock shaft 412 and the link 452 (Fig. 2). Thus, after the release in the raceway 246 of the lowermost part 22 therein, the latter may slide in the remainder of the raceway into a position similar to that shown in Fig. 18A, or may slide directly on top of member 262 and remain thereon, or may first slide on top of member 262 and then rebound somewhat from the adjacent end wall of the guide groove 246b in the base plate of the raceway 246 into a position similar to that shown in Fig. 18A. The finger members 264 and 266 (Figs. 4 and 18) then perform as follows. After the lowermost snap fastener part 22 has been released in the raceway 246 and gravitated toward the member 262, as above described, finger member 266 is, by the action of the cam 308 (Fig. 17), advanced in slot 246c in the raceway (Fig. 18A), whereby the released part 22 will be pushed by finger member 266 onto the top of member 262, unless the snap fastener part 22 has, on its release in the raceway, gravitated all the way to the top of member 262 and has remained thereon. The finger member 266 is thus advanced by the cam-operated bar 286 (Figs. 17 and 18) through intermediation of bell-crank lever 272, 280 and bar 268 with which finger member 266 is, in the present instance, integral. Simultaneously with the advance of finger member 266, the finger member 264 is advanced by the pin 320 on bar 286 (Figs. 17 and 18) from the position shown in Fig. 18 into a position above member 262. In thus advancing finger member 264, the same will move over member 262 when a released part 22 in the raceway 246 will be pushed onto the top of member 262 by the finger member 266, thus preventing said part 22 from jumping away from the top of member 262 if said part has to be pushed onto the top of member 262 by the rapidly advancing finger member 266. When a snap fastener part 22, after its release in the raceway 246, slides all the way into position on the member 262, and even if it should slightly rebound from that position as above explained, its gravity descent toward the member 262 in the bottom end of the raceway is frictionally sufficiently retarded in the latter to prevent said part 22 from jumping from the guide groove 246b in the base plate of the raceway. Thus, the explained part-retaining function of the finger member 264 is required only whenever a released snap fastener part is pushed onto the top of member 262 by the finger member 266, since the latter is advanced so rapidly that a part 22 pushed thereby may, in the absence of the finger member 264, jump from the guide groove 246b on its rebound from the front end wall of the latter. The tape F on top of the frame plate 46 would not always prevent the occasional jumping of a snap fastener part from the top of member 262, and it is for this reason that finger member 264 has been provided. As soon as a released snap fastener part 22 is positively located on top of the member 262, the finger members 264 and 266 are retracted by the action of the cam 306 (Fig. 17).

At the beginning of an operation of the attaching means M, the spindle 324 descends, on the downward stroke of plunger 336, from its uppermost position and impales the foremost, resiliently held part 20 of the female snap fastener elements in the discharge end of the raceway 322, in the course of which the spring elements 36 in the impaled part 20 become yieldingly interlocked with the groove 328 in the spindle 324. As soon as part 20 is thus impaled and yieldingly locked on spindle 324, raceway 322 is rocked away from spindle 324, by the action of the cam face 424 of disc 408 and through intermediation of arm 418 on rock shaft 412 with its actuating arm 422 (Fig. 2), whereby the impaled part 20 is removed from raceway 322 and will be carried solely by the continuously descending spindle 324 into the position upon the tape F shown in Fig. 12. Continued descent of the plunger 336 (Fig. 11) into its lowermost position will bring the bottom face 350 of stem 332 into engagement with part 20, as shown in Fig. 12. The plunger 352 (Fig. 12) is thereafter moved upwardly by the pin 372 (Fig. 15), the arms 374 and 378 on rock shaft 376, the bar 380 with its roller 384, and cam 382 on driven shaft 134. When the plunger 352 is thus raised, the same flattens the portion 28A of the snap fastener part 20 and clenches the same against the companion part 22 (Fig. 32), thus completing the attachment of the parts 20 and 22 to each other and to the tape. Thereafter, cam 382 moves out of engagement with roller 384 and allows spring 368 (Fig. 15) to retract plunger 352 to the position shown in Fig. 12. Plunger 336 and the parts 324 and 332 carried thereby are then also retracted to uppermost position by the action of the eccentric pin 406 which through the rod 404 rocks the plunger-operating arm 398 (Fig. 2). The foregoing cycle of operation of the machine is repeated as long as the machine is power-driven, as will be readily understood.

While I have shown and described the preferred embodiment of my invention, it will be understood that the invention may be embodied otherwise than as herein specifically illustrated or described, and that in the embodiment herein disclosed, various changes in the details of construction and in the arrangement of parts may be made without departing from the underlying

Having thus described my invention, what I claim and desire to secure by Letters Patent is:

1. In a machine for producing snap-fastener tape, said machine having means for attaching the companion parts of the snap fastener members to the tape; means for feeding said tape intermittently to advance successive longitudinally spaced portions thereof to said attaching means, and means spaced from said feeding means longitudinally of said plate and including a punch reciprocable to and from the latter for punching holes through the tape at said longitudinally spaced portions thereof, said tape-feeding means comprising a pair of tape gripping members arranged to grip the tape at opposite sides, respectively, thereof, said gripping members being mounted for reciprocation longitudinally of the tape and for movement toward and away from each other transversely of the tape for gripping and releasing the tape, and means for imparting said longitudinal and transverse movements to said gripping members, said gripping members being in gripping relation with the tape when they are moved longitudinally in the direction of feed of the tape and being released from the tape when they are moved longitudinally of the tape in the opposite direction, means for reciprocating said hole punching means longitudinally of the tape in unison with the reciprocation of said gripping members, and means projecting said plunger through said tape substantially at the start of each feed stroke of said feeding means for punching a hole in said tape, and maintaining said plunger projected through the punch hole in the tape substantially to the end of said feed stroke of the feeding means.

2. In a machine for producing snap-fastener tape, said machine having means for attaching the companion parts of the snap fastener members to the tape; means for feeding said tape intermittently to advance successive longitudinally spaced portions thereof to said attaching means, and means for punching holes through the tape at said longitudinally spaced portions thereof, said tape-feeding means comprising a pair of tape gripping members arranged to grip the tape at opposite sides, respectively, thereof, said gripping members being mounted for reciprocation longitudinally of the tape and for movement toward and away from each other transversely of the tape for gripping and releasing the tape, and means for imparting said longitudinal and transverse movements to said gripping members, said gripping members being in gripping relation with the tape when they are moved longitudinally in the direction of feed of the tape and being released from the tape when they are moved longitudinally of the tape in the opposite direction, and means for reciprocating said hole punching means longitudinally of the tape in unison with the reciprocation of said gripping members, said hole-punching means comprising a plunger mounted for projection through the tape during the movement of the tape in the feeding direction thereof, and means for actuating said plunger to punch a hole through the tape during the feeding movement thereof.

3. In a machine for producing snap-fastener tape, said machine having means for attaching the companion parts of the snap fastener members to the tape; means for feeding said tape intermittently to advance successive longitudinally spaced portions thereof to said attaching means, and means for punching holes through the tape at said longitudinally spaced portions thereof, said hole-punching means comprising a plunger mounted for reciprocation longitudinally of the tape and for projection through the tape during the movement of the tape in the feeding direction thereof, and means for actuating said plunger to punch a hole through the tape during the feeding movement thereof.

4. In a machine for producing snap-fastener tape, said machine having means for attaching the companion parts of the snap fastener members to the tape; means for feeding said tape intermittently to advance successive longitudinally spaced portions thereof to said attaching means, and means for punching holes through the tape at said longitudinally spaced portions thereof, said hole-punching means comprising a plunger mounted for reciprocation longitudinally of the tape and for projection through the tape during the movement of the tape in the feeding direction thereof, and means for actuating said plunger to punch a hole through the tape during the feeding movement thereof, said plunger moving with the tape in engagement therewith in the direction of the feed of the tape and moving in the opposite direction longitudinally of the tape out of engagement therewith following the hole punching operation of the plunger.

5. In a machine for punching holes through tape at points spaced longitudinally thereof, means for intermittently feeding the tape in the direction of its length, and hole punching means spaced from said feeding means longitudinally of the tape and including a plunger intermittently movable transversely of the tape for punching holes therethrough and movable also in the direction of feed of the tape while in engagement with the tape in the hole made by said plunger.

6. In a machine for punching holes through tape at points spaced longitudinally thereof, means for intermittently feeding the tape in the direction of its length, said feeding means including members movable into and out of engagement with the tape at opposite sides thereof and movable, while engaged with the tape, in the direction of feed of the tape, and movable in the opposite direction when disengaged from the tape, and hole punching means spaced from said feeding means longitudinally of the tape and including a plunger intermittently movable transversely of the tape for punching holes therethrough and movable also in the direction of feed of the tape while in engagement with the tape in the hole made by said plunger, said plunger being movable in the opposite direction out of engagement with the tape.

7. In a machine for attaching snap fastener members, each having initially separate parts, to a tape, said machine having an attachment station at which the fastener members are attached to the tape, means for depositing certain of said companion snap fastener parts one at a time at said station at one side of the tape, a raceway at the other side of the tape for supplying the snap fastener parts companionate to said deposited parts, respectively, said raceway being movable to and from a supplying station and each of said companionate parts having a hollow stem, and a pin mounted for axial reciprocation past said supplying station toward and away from the opposite side of the tape and operable in its movements toward said supplying station and tape to impale the hollow stems of successive companionate parts, respectively, in the discharge end of said raceway at said supplying station and to carry said impaled parts from said raceway into engagement with the companion parts, respectively, of the successive fastener members and with the tape at said attachment station, means moving said raceway away from said supplying station each time said stem impales one of said companionate parts in order to remove the latter from said raceway, and cam means carried by said raceway at the discharge end thereof, said cam means being designed to engage, during movement of said raceway away from said supplying station, the impaled part on said pin after its removal from said raceway and force it axially more firmly on the adjacent end of said pin during a part of the continued movement of the latter toward said tape.

8. In a machine for attaching the companion parts of snap fastener members to a tape at longitudinally spaced holes thereof, a support provided with an opening, means for intermittently longitudinally moving said tape on said support to bring successive holes in the tape into registry with said opening, means operated in timed relation with said tape-moving means for positioning a snap fastener part below the tape and in registry with said opening in the support, means operated in timed relation with said tape-moving means and including an element moving into a lowermost position while said tape is intermittently stationary for releasably carrying a companion snap fastener part from a position above the tape toward the latter and for projecting a portion of said companion part through the registering tape hole at said opening in the support, and means also operated in timed relation with said tape-moving means and moving in said opening in the support toward and away from the tape for clenching the end of the projected portion of said companion snap fastener part against the adjacent snap fastener part below the tape while said element is in its lowermost position and holds said companion part against said adjacent part, thereby permanently securing the last mentioned parts to each other and to the tape.

9. In a machine for attaching the companion parts of snap fastener members to a tape at longitudinally spaced holes therein, a support having an opening therein, means for intermittently longitudinally moving said tape on said support to bring the holes in the tape successively into registry with said opening, means operable in timed relation with said tape-moving means for positioning a centrally apertured snap fastener part below the tape and in registry with said opening in the support, means operated in timed relation with said tape-moving means including an element moving into a lowermost position while said tape is intermittently stationary for releasably carrying a companion snap fastener part with a projecting stem from a position above the tape toward the tape for projecting the stem of said companion part through the registering hole in the tape and the central aperture in the adjacent registering part, and a punch reciprocating, in timed relation with said tape-moving means, in said opening in the support toward and away from the tape for clenching said stem of the registering companion part against the centrally apertured portion of the other registering part while said element is in its lowermost position and holds said companion part against the adjacent registering part, thereby permanently securing the last mentioned parts to each other and to the tape.

CHARLES L. LOVERCH.

REFERENCES CITED

The following references are of record in the file of this patent:

UNITED STATES PATENTS

| Number | Name | Date |
|---|---|---|
| 298,201 | Hawkins | May 6, 1884 |
| 425,209 | Carpenter | Apr. 8, 1890 |
| 431,001 | Mathison | June 24, 1890 |
| 581,855 | Glass | May 4, 1897 |
| 624,279 | White | May 2, 1899 |
| 688,078 | Flagg | Dec. 3, 1901 |
| 902,827 | Mathison | Nov. 3, 1908 |
| 955,195 | Perley | Apr. 19, 1910 |
| 1,083,420 | White | Jan. 6, 1914 |
| 1,181,292 | Cobley | May 2, 1916 |
| 1,228,768 | Glass | June 5, 1917 |
| 1,271,721 | Shaw | July 9, 1918 |
| 1,307,997 | Berkley | June 24, 1919 |
| 1,371,329 | Smith | Mar. 15, 1921 |
| 1,415,924 | Dovey | May 16, 1922 |
| 1,719,480 | Linden | July 2, 1929 |
| 1,815,862 | McCue | July 21, 1931 |
| 1,833,268 | Spry | Nov. 24, 1931 |
| 1,861,186 | Littell et al. | May 31, 1932 |
| 1,975,413 | Veillette | Oct. 2, 1934 |